United States Patent Office 2,739,806
Patented Mar. 27, 1956

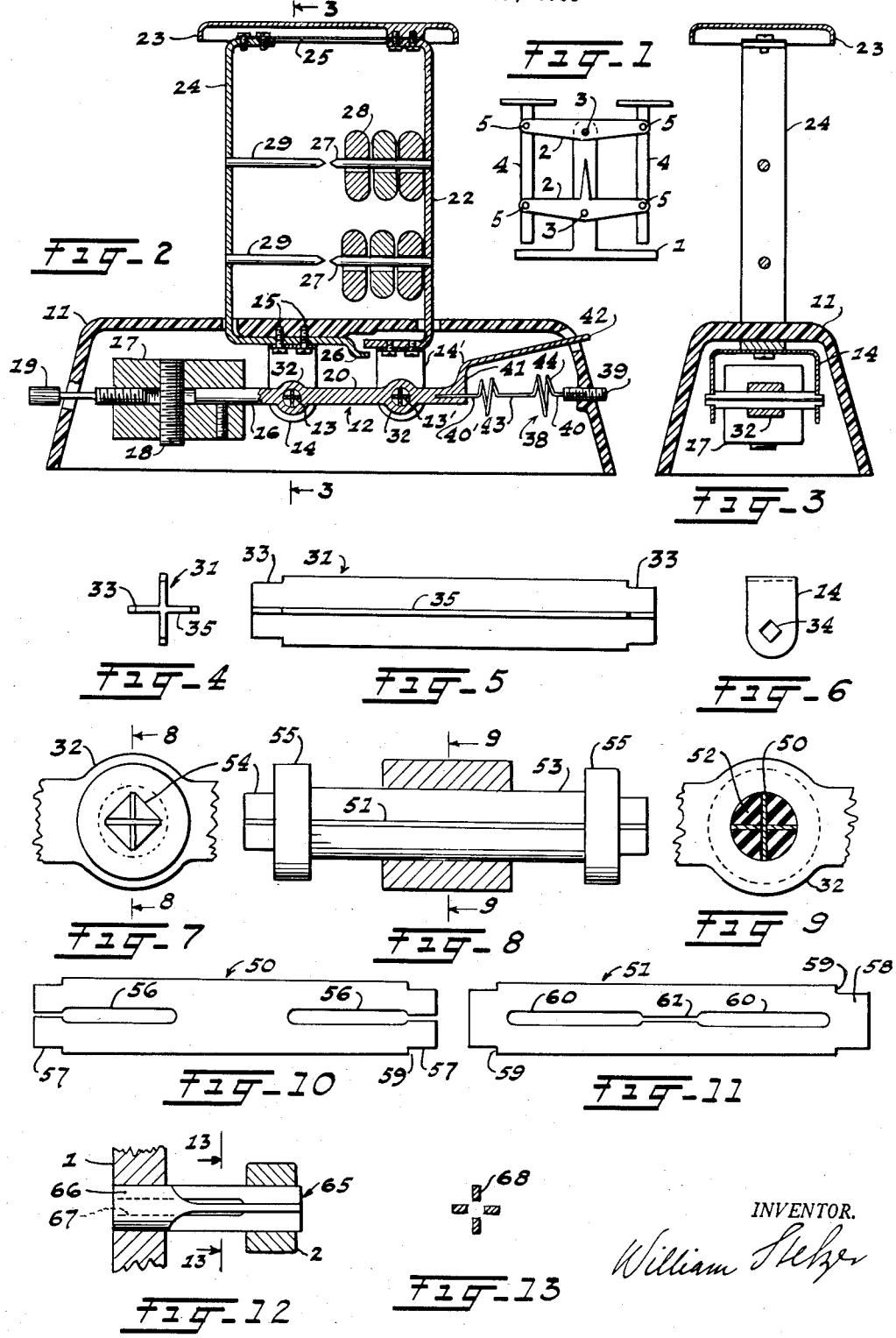

2,739,806

LOAD BEARING PIVOTS FOR BALANCES AND COMPENSATING MEANS THEREFOR

William Stelzer, Summit, N. J.

Application October 26, 1953, Serial No. 388,173

8 Claims. (Cl. 265—63)

The invention relates to weighing mechanisms and more particularly to spring type load bearing pivots for balances and compensating means therefor. This application is a continuation-in-part of my application Ser. No. 180,620 filed Aug. 21, 1950, now Patent No. 2,681,222.

Spring type pivots consisting of plates or short leaf springs have been successfully used to eliminate friction in balances where the load carrying beam travels only a short distance. While such leaf spring pivots are very practical they nevertheless have the disadvantage that the effective pivot point is not fixed while the leaf spring flexes, affecting the accuracy of the balance because the lengths of the levers or links change.

The object of the present invention is to provide a novel torsional pivot of rugged construction where the pivotal axis remains fixed.

Another object is to provide a pivot pin acting as a spring offering a minimum resistance to torsion but maximum resistance to bending.

A further object of the invention is to incorporate means to compensate for the varying torsional resistance of the pivot pin to control the sensitivity of the balance.

Other objects and advantages of this invention will be apparent from the following detailed description considered in connection with the accompanying drawing submitted for the purpose of illustration and not to define the scope of the invention, reference being had for that purpose to the subjoined claims. In the drawing, wherein similar reference characters refer to similar parts throughout the several views:

Fig. 1 is a front view of a conventional counterscale or comparing balance using pivots of the improved design;

Fig. 2, a sectional front elevation of a weigher incorporating my invention;

Fig. 3, a section taken on lines 3—3 of Fig. 2;

Fig. 4, an enlarged end view of the novel torsional pivot pin;

Fig. 5, a side view thereof;

Fig. 6, a detail view of a bracket for supporting a pivot pin, the view being in the same direction as in Fig. 2;

Fig. 7, a fragmentary view on a larger scale of the beam of the weigher incorporating a modified pivot pin, looking in the direction of Fig. 2;

Fig. 8, a section taken on lines 8—8 of Fig. 7;

Fig. 9, a section taken on lines 9—9 of Fig. 8;

Fig. 10, an elevation of a leaf spring making up the modified pivot pin;

Fig. 11, a plan view of another leaf spring of the modified pivot pin;

Fig. 12, a section showing the invention incorporated in a cantilever type pivot pin as applied to a balance illustrated in Fig. 1; and Fig. 13, a section taken on lines 13—13 of Fig. 12 with the beam removed.

Before explaining the present invention in detail, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not limitation.

The invention is shown incorporated in a weighing mechanism of a class disclosed in the above-mentioned co-pending application, but it is apparent that the pivot and compensating device can be used equaly well in conventional balances. Such a balance is illustrated in Fig. 1, where numeral 1 indicates a frame or base supporting a pair of parallel beams 2 by fulcrums 3, the beams carrying a pair of vertical bars 4 provided with platters or pans. The bars are connected by pivots 5 which are at a higher elevation than fulcrum 3 to give a compensating effect as the resultant force of both bars acts above fulcrum 3. Fulcrums 3 as well as pivots 5 may contain the novel pivots described in detail later with reference to Figs. 4–13. Referring now to Figs. 2 and 3, the weighing mechanism comprises a base 11 within which is housed a beam indicated in its entirety by numeral 12 and pivotally supported by base 11 at fulcrum 13 through the medium of an inverted U-shaped bracket 14 secured to base 11 with screws 15. Beam 12 has an arm 16 supporting a resistant consisting of a weight 17 provided with an adjusting screw 18 for adjusting the center of gravity of weight 17 vertically and and adjusting screw 19 for adjusting the force of the resistant. An opposite horizontal arm 20 of beam 12 has a pivot 13' to pivotally support a load carrying member 22 through the medium of another inverted U-shaped bracket 14' similar to bracket 14. The load carrying member 22 consists of an upright post whose upper end carries a rigidly secured platter 23 on which the load to be weighed is placed. A fixed upright post 24 secured at its lower end to base 11 by screws 15 serves to support at its upper extremity one end of a horizontal leaf spring 25 whose other end is clamped between load carrying member 22 and platter 23, this leaf spring 25 and arm 20 serving as parallel arms to restrict load carrying member 22 to a vertical movement where all points of platter 23 have equal velocity. The lower fixed end of post 24 is extended at 26 to restrict the vertical movement of load carrying member 22. The latter has racks 27 carrying complemental weights 28 of known weight which may be shifted to stationary racks 29 extending horizontally from post 24.

The complemental weights serve to counterbalance weight 17 so that beam 12 is in equilibrium. When a load to be weighed is placed on platter 23, the weights removed from rack 27 until equilibrium is attained are equal to the weight of the load.

The pivots 13 and 13' comprise pivot pins 31 of spring steel or other resilient material pressed into bores in bosses 32 of beam 12 so that the pressed-in part cannot turn. The ends of the pins have shoulders 33 as shown in Figs. 4 and 5, fitting tightly into the square holes 34 (Fig. 6) of brackets 14 and 14' so that the ends are firmly held against rotation. Fig. 3 illustrates that pins 31 extend equal distances from both sides of beam 12 and that twisting of the pin is restricted to the portion between hole 34 and the side of beam 12. In order to make twisting possible, the pin is weakened against torsion and reinforced against bending by being fluted or star-shaped in cross-section, or the pin may be considered as having a plurality of radial fins or leaves 35 being radially disposed from the axis of pin 31 and extending longitudinally and parallel with the axis of the pin. Each fin may be considered as a beam whose height increases the resistance to bending of the central axis and whose width is reduced to thereby decrease the resistance against torsion. It will be noted that twisting of the pin in no way changes the position of the pivot, because all fins are symmetrical about the central axis of pin 31, whereby the distance between pivots 13 and 13' or between fulcrums 3 and pivots 5 remains constant at all times.

Pin 31 may be regarded as a torsion spring which offers a resistance to twisting, this resistance increasing proportionally with the rotary distortion or twist. To compensate for such resistance the pivots may be positioned as shown in Fig. 1 where the resultant center of gravity of the gravitational forces transmitted by bars 4 to beams 2 is located a short distance above fulcrums 3, or in the construction shown in Fig. 2 the center of gravity of weight 17 and of the weight acting on pivot 13' are located a short distance above pivot or fulcrum 13, so that the resultant of the gravitational force of weight 17 and the gravitational force acting on fulcrum 13' is located a short distance vertically above pivot 13. The latter distance may be changed by adjusting screw 18; the greater the distance, the greater is the compensating force. The resistance of pins 31 can also be compensated for by an over-center spring such as by a helical compression spring 38 adjustably supported at one end 40 by an adjusting screw 39 in base 11 and the other end 40' engaging an extension 41 of beam 12, one portion of this extension serving as an indicator or pointer 42. The ends 40 and 40' as well as the central straight wire 43 are concentric with the coils of the spring and fit snugly into respective holes in screw 39 and extension 41 so that there is no play but yet screw 39 may be turned. Spring 38 and extension 41 together act as a toggle, where the coils near extension 41 are the knee, extension 41 and straight portion 43 are the legs of the toggle pivoted at 13' and coils 44 respectively. A similar compensating spring has been shown in my co-pending application Ser. #345,813, filed Mar. 31, 1953, now Patent No. 2,698,747. When the spring is on dead center, the adjusting force is zero, while movement away from dead center increases the moment about fulcrum 13 in one direction and decreases it in the other direction proportional to the movement so that the resistance of pin 31 may be fully compensated.

In the modification shown in Figs. 7–11 the pivot pin is made up of two separate flat springs 50 and 51 assembled at right angles to each other as shown in Fig. 9 to serve as the skeleton for a pin of rubber or rubberlike material 52. The rubber is moulded after springs 50 and 51 are placed into the bores in bosses 32 so that the rubber is thoroughly bonded not only to the springs but also to lever 12. The central portion 53 is cylindrical, but the ends 54 are square to firmly fit into square holes 34 of brackets 14 and 14'. Rubber collars 55 are moulded to cylindrical portions 53 to rest against the inside surface of brackets 14 and 14'. If the rubber pin is to be moulded separate from beam 12 and afterwards pressed into the holes of bosses 32, then collars 55 should be omitted. Spring 50 has longitudinal slots 56 restricted in width at stepped ends 57 to the thickness of the spring so that when assembled over ends 58 of spring 51 a solid construction is obtained that can be pressed into holes 34. Shoulders 59 rest against the inside surface of the downwardly pointing legs of brackets 14 and 14'. Spring 51 has solid ends but the intermediate portion is slotted at 60 with a narrower slot 61 in the center so that the central portion of spring 50 fits into this slot and serves to stiffen spring 51 against contraction towards the axis of the pivot. The rubberlike material moulded in place not only serves to hold the assembly of springs and beam together, but also helps to produce a better grip between beam and pin as well as between pin and bracket, as this is necessary to prevent any possible friction.

The pivot in Figs. 12 and 13 consists of a cantilever pin 65 of resilient material as incorporated in a balance shown in Fig. 1. This pin is cross-shaped in cross-section as shown in Fig. 13 and has an end pressed into a hole in beam 2. The other end or shank 66 is left cylindrical and is pressed tightly into support 1 or into vertical member 4. A central hole 67 serves to further weaken the pin against torsion, as hole 67 extends through the free or unsupported portion of the pin to separate the fins or leaves 68 into four separate leaf springs radially disposed and extending longitudinally parallel with the axis of pin 65. Hole 67 extends also through shank 66 merely because it is easiest to separate fins 68 by drilling a small hole prior to milling flutes which produce the fins 68. If the pin is moulded of a tough resilient plastic, shank 67 may be left solid.

Describing now the operation of the weigher shown in Figs. 2–6, the device is in balance when all weights are on pins 27 and no load is on platter 23. If one weight is shifted onto fixed rack 29, then if a load equal to the removed weight is placed on platter 23, the weigher is in balance and the points of the racks lined up as shown. The torsional resistance of pivot pins 13 and 13' causes a turning moment in beam 12 which must be compensated by adjusting weight 17 or 19 to obtain a balanced position as shown, when the load carrying member 22 carries all weights and no load. A further compensation is obtained by spring 38, which compensates for the rate of increase in the torsional resistance of pivot pins 13 and 13'.

The weigher in Fig. 1 is in balance because it is symmetrical about fulcrums 3. The pivot pins are not under torsional stress when the weigher is in the position shown. The compensation for the torsional resistance of the pivot pins in pivots 3 is provided by placing the center of gravity of the beams above the axes of the fulcrums. Thus the weight of a beam concentrated above its fulcrum compensates for the change in resistance of the pivot pin. The distance of the center of gravity of beam 2 above fulcrum 3 depends on the torsional stiffness of the pivot pin. If the torsional resistance is small, then the distance of the center of gravity above fulcrum 3 can be short. In using the weigher the load is placed on the platter of one vertical bar 4 and known weights on the other until the pointer is in the center. If the pointer is not vertical and the pins stressed to offer a resistance, then the center of gravity has moved over dead center whereby the weight concentrated at the center of gravity produces a turning moment which compensates for the resistance of the pivot pins. In pin 65 shown in Fig. 12 torsion takes place only in the position intermediate frame 1 and beam 2.

The pivot pin shown in Figs. 7–11 operates in a similar manner as pin 31. The outer ends are rigidly supported and the central portion is firmly secured to beam 12 so that twisting takes place only intermediate the outer fixed ends and the portion fixed to beam 12.

Having thus described my invention, I claim:

1. In weighing mechanisms including a member rotatable relative to another member, in combination, a pivot element comprising a resilient straight pin of symmetrical cross-section weakened to yield to torsional stresses, means to reinforce said pin against bending of its axis, said pin having a portion rigidly secured to one of said members and another portion rigidly secured to the other of said members, whereby said members may be rotated relative to each other a short angular distance about said pin by torsion of said pin, said pin offering an increasing resistance proportional to the angular distortion of said pin, and compensating means to compensate for the increase in resistance to torsion of said pin to render said resistance approximately constant.

2. In weighing mechanisms including a member rotatable relative to another member, in combination, a torsional pivot element consisting of leaf springs arranged to offer reduced resistance to torsional stresses but increased resistance to bending stresses, said leaf springs having a portion rigidly secured to one of said members and another portion rigidly secured to the other of said members, whereby said members may be rotated relative to each other a short angular distance about said pivot element by torsion of said pivot element, and means to compensate for the resistance to torsion offered by said leaf springs.

3. In a weighing mechanism having one member rotatable relative to another member, in combination, a resilient pivot pin weakened to yield to torsion and reinforced to resist bending stresses, said pivot pin having a portion rigidly secured to one of said members and another portion rigidly secured to another of said members, whereby said members may be rotated relative to each other a short angular distance about said pivot pin by torsion of said pivot pin, and means to compensate for the resistance to torsion offered by said pivot pin, said means including an over-center spring acting on said rotatable member.

4. The construction according to claim 3, where said over-center spring consists of a compression spring forming a toggle with said one member where a portion of said one member acts as one leg of said toggle and said spring acts as the other leg of said toggle, said legs forming an approximately straight line pointing towards said pivot pin.

5. In a weighing mechanism including a double armed fulcrumed beam and a stationary support, the arms of said beam being subjected to gravitational forces acting at certain points, in combination, a resilient pivot pin to serve as fulcrum for said beam, said pivot pin being weakened to yield to torsion and reinforced to resist bending stresses, said pivot pin having a portion rigidly secured to said stationary support and another portion rigidly secured to said beam whereby said beam may be rotated about said pivot pin a short angular distance by torsion of said pivot pin, and means to compensate for the resistance to torsion offered by said pivot pin.

6. The construction according to claim 5, where said means to compensate for the resistance to torsion consists of a geometry where said fulcrum is below a line projected between said points where said gravitational forces act so that the resultant gravitational force acts on a point slightly above the axis of said pivot pin.

7. In a weighing mechanism including a member rotatable relative to another member, in combination a pivot comprising a straight fluted pin of resilient material having radial fins extending longitudinally and parallel with the axis of said pin so as to be weakened to yield to torsional stresses, said pin having a portion rigidly secured to one of said members and a spaced portion rigidly secured to the other of said members, an intermediate portion of said pin being unsupported to be free to twist about its axis, whereby said members may be rotated relative to each other a short angular distance about said pin by torsion of said pin, said pin having an axial hole in said unsupported portion to further weaken said pin against torsional stresses.

8. A weighing mechanism having a stationary member comprising a pivotal support, a weighing beam carried by said pivotal support, said weighing beam having an arm extending horizontally from one side of said pivotal support to carry an adjustable weight, another arm extending horizontally from an opposite side to pivotally support a load carrying member, said load carrying member comprising a platter to receive a load to be weighed, a rack on said load carrying member to carry complemental weights, a rack on said stationary member to receive complemental weights removed from said rack, said complemental weights being of known weight, whereby said beam is in balance when said complemental weights are carried by said rack of said load carrying member with no load on said platter, a fluted pivot pin of resilient material for said pivotal support, said pin having ends rigidly supported by said stationary member and a central portion rigidly secured to said weighing beam, so that said beam may be rotated a short distance by torsion of said pin, and means to compensate for the resistance to torsion of said pivot pin to adjust the sensitivity of said weighing mechanism.

References Cited in the file of this patent

UNITED STATES PATENTS

| Number | Name | Date |
|---|---|---|
| 671,789 | Borgeson | Apr. 9, 1901 |
| 1,702,455 | Trumpler | Feb. 19, 1929 |
| 2,082,968 | Morris | June 8, 1937 |
| 2,087,354 | Muffly | July 20, 1937 |
| 2,238,380 | Almen | Apr. 15, 1941 |
| 2,417,392 | Craig | Mar. 11, 1947 |
| 2,681,222 | Stelzer | June 15, 1954 |